United States Patent [19]
Kelledes et al.

[11] Patent Number: 5,584,371
[45] Date of Patent: Dec. 17, 1996

[54] VISCOUS FAN DRIVE SYSTEM LOGIC

[75] Inventors: William L. Kelledes, Canton; Walter K. O'Neil, Birmingham; Rick L. Boyer, Battle Creek, all of Mich.

[73] Assignee: Eaton Corporation, Cleveland, Ohio

[21] Appl. No.: 522,025

[22] Filed: Aug. 31, 1995

[51] Int. Cl.⁶ .................................................. F16D 35/02
[52] U.S. Cl. ................... 192/58.61; 192/58.62; 192/82 T; 192/103 R; 123/41.12
[58] Field of Search ............................. 192/58.61, 58.62, 192/82 T, 103 R, 103 F; 123/41.49, 41.12

[56] References Cited

U.S. PATENT DOCUMENTS

| | | | |
|---|---|---|---|
| 3,568,647 | 3/1971 | Adams | 123/41.12 |
| 4,228,880 | 10/1980 | Gee | 192/58.62 X |
| 4,320,723 | 3/1982 | Wendling et al. | 123/41.12 |
| 4,348,991 | 9/1982 | Stang et al. | 123/41.29 |
| 4,469,053 | 9/1984 | Sakurai | 123/41.12 |
| 4,475,485 | 10/1984 | Sakakibara et al. | 123/41.05 |
| 4,627,397 | 12/1986 | Hayashi | 123/41.27 |
| 4,650,045 | 3/1987 | Weible et al. | 192/58.62 X |
| 4,828,088 | 5/1989 | Mohan et al. | 192/58.62 |
| 4,920,929 | 5/1990 | Bishop | 123/41.49 |
| 4,938,331 | 7/1990 | Ohmi et al. | 192/58.43 |
| 5,042,629 | 8/1991 | Elmer | 192/58.62 |
| 5,224,446 | 7/1993 | Okita et al. | 123/41.12 |

*Primary Examiner*—Richard M. Lorence
*Attorney, Agent, or Firm*—L. J. Kasper

[57] ABSTRACT

A method of controlling a viscous fluid coupling (15) in which, when the vehicle engine (E) is operating at low speeds, if the speed of rotation (SF) of the fan exceeds a predetermined speed limit (L3), the input signal (29) to the coupling is modified to move the valve member (49) toward a closed position (FIG. 3A). This action reduces the occurrence of an overfill condition, thus reducing undesired fan noise when the engine again accelerates. Another aspect of the invention is to sense the speed (SE) of the engine, and whenever the sensed speed (SE) is high enough that operation in an excess slip heat region (ESH) is possible, compare the demanded fan speed (29) to the lower limit (CHP) of the slip heat region. Whenever the demanded fan speed exceeds the limit, the input signal (29) to the coupling is modified to operate the coupling at a speed safely above or below the slip heat region (ESH) depending on the state of control inputs such as engine temperature.

8 Claims, 6 Drawing Sheets

VISCOUS FAN DRIVE SYSTEM LOGIC

BACKGROUND OF THE DISCLOSURE

The present invention relates to viscous fluid couplings, and more particularly, to such couplings which are used to drive vehicle radiator cooling fans, wherein the engagement or disengagement of the viscous fluid coupling may be controlled in response to a remotely sensed condition, such as coolant temperature.

A viscous fluid coupling (viscous fan drive) of the general type to which the present invention relates is illustrated and described in U.S. Pat. No. 3,055,473, assigned to the assignee of the present invention, and incorporated herein by reference. A typical viscous coupling receives input drive torque from a vehicle engine, and transmits output drive torque to a radiator cooling fan. The conventional viscous coupling includes an output coupling defining a fluid chamber, valve means operable to separate the fluid chamber into a reservoir chamber and an operating chamber, and an output coupling rotatably disposed in the operating chamber and operable to transmit input drive torque to the output coupling in response to the presence of viscous fluid in the operating chamber. The valve means includes a valve member moveable between a closed position blocking fluid flow into the operating chamber, in an open position permitting fluid flow into the operating chamber.

In certain vehicle applications, it has become desirable to sense directly some parameter of the vehicle, such as the temperature of the liquid coolant entering the radiator ("top-tank" temperature), and to control the viscous fan drive in response to changes in that parameter. One benefit of the arrangement described is that the responsiveness of the fan drive is improved, when compared to the earlier, prior art fan drive which was responsive only to sensed ambient air temperature. Accordingly, the conventional fan drive described above has been modified by the addition of an actuator means operable to move the valve member between the closed position and the open position in response to changes in an input signal. Such a "remote sensing" viscous coupling is illustrated and described in U.S. Pat. No. 5,152,383, assigned to the assignee of the present invention and incorporated herein by reference.

Viscous fan drives have been extremely successful commercially for many years. However, in the course of development, testing, and operation of viscous fan drives (whether of the ambient temperature sensing type, or of the remote sensing type), there are several operating situations in which the prior art viscous fan drives have not responded adequately.

One of these operating situations is referred to as the "stoplight idle" condition. When a vehicle equipped with a conventional viscous fan drive comes to rest, for example, at a traffic signal, engine speed falls below the "demanded" fan speed, i.e., the fan speed necessary to cool the engine adequately. Of course, in a conventional fan drive installation, the fan speed can never exceed the input speed (engine speed multiplied by the pulley ratio). For a remote sensing clutch with classic (prior art) feedback control, the fan drive logic will, therefore, move the valve member toward a fully open position, filling the operating chamber with fluid in a vain attempt to reach the "demanded" fan speed. A similar result occurs with ambient air sensing type clutches. In a stop light idle condition, a bimetallic control element will either not change the position of the partially open valve, or will actually move the valve further toward the open position. This is caused by heated air dissipated by the vehicle engine.

Unfortunately, when the vehicle accelerates from the stopped condition at the traffic signal, the fan drive operates in a fully engaged condition, when such is not really necessary, resulting in excessive fan noise as the input speed to the fan drive increases. This undesirable noise continues until enough fluid is pumped from the operating chamber to the reservoir chamber to bring the fan drive down to the then-current demanded fan speed.

SUMMARY OF THE INVENTION

Accordingly, it is an object of the present invention to provide an improved method for controlling a viscous fluid coupling which will overcome the above-described stoplight idle condition.

It is a more specific object of the present invention to provide an improved method of controlling a viscous fluid coupling which is capable of sensing the existence of the stoplight idle condition and preventing an undesirable increase in the amount of fluid in the operating chamber of the coupling.

The above and other objects of the invention are accomplished by the provision of an improved method of controlling a viscous fluid coupling of the type described above. The improved method comprises the steps of:

(a) sensing the speed of the vehicle engine;

(b) comparing the sensed engine speed to a first limit and to a second limit, and when the engine speed is greater than the first limit, but less than the second limit, then (c) sensing the speed of rotation of the radiator cooling fan;

(d) comparing the fan speed to a predetermined fan speed limit, and when the fan speed is greater than the predetermined fan speed limit;

(e) modifying the input signal to move the valve member toward the closed position.

The other operating condition in which the conventional viscous fan drive has not been satisfactory is the "slip heat" condition. Every viscous fluid coupling has a "slip heat" region in its graph of output speed versus input speed which represents a region of operation beyond the recommended design limits, as will be described in greater detail subsequently. When operating at an input speed and an output speed within the slip heat region, the viscous coupling generates more slip heat than the coupling can dissipate. Continued operation in the slip heat region would eventually degrade the viscous fluid and the performance of the coupling.

Accordingly, it is an object of the present invention to provide an improved method of controlling a viscous fluid coupling which enables the coupling to avoid prolonged operation in the slip heat region.

It is a more specific object of the present invention to provide an improved method of controlling a viscous coupling wherein, when operation in the slip heat region is sensed, or likely to occur, the speed of the output coupling is modified until the coupling is operating outside of (above or below) the slip heat region.

The above and other objects of the invention are accomplished by the provision of an improved method of controlling a viscous fluid coupling comprising the steps of:

(a) generating a demanded fan speed;

(b) sensing the speed of the vehicle engine;

(c) comparing the sensed engine speed to a first limit, and if the sensed engine speed is greater than the first limit, then (d) determining, for the particular sensed engine speed, a fan speed corresponding to a maximum safe fan speed below a slip heat region;

(e) comparing the demanded fan speed to the maximum safe fan speed, and when the demanded fan speed is greater than the maximum safe fan speed;

(f) sensing a temperature representative of the need for cooling and comparing the sensed temperature to a temperature high limit, and when the sensed temperature is less than the temperature high limit, setting demanded fan speed equal to the maximum safe fan speed; or (g) when the sensed temperature is greater than the temperature high limit, modifying the input signal to move the valve member toward the open position.

DESCRIPTION OF THE PREFERRED EMBODIMENT

Figure 1:
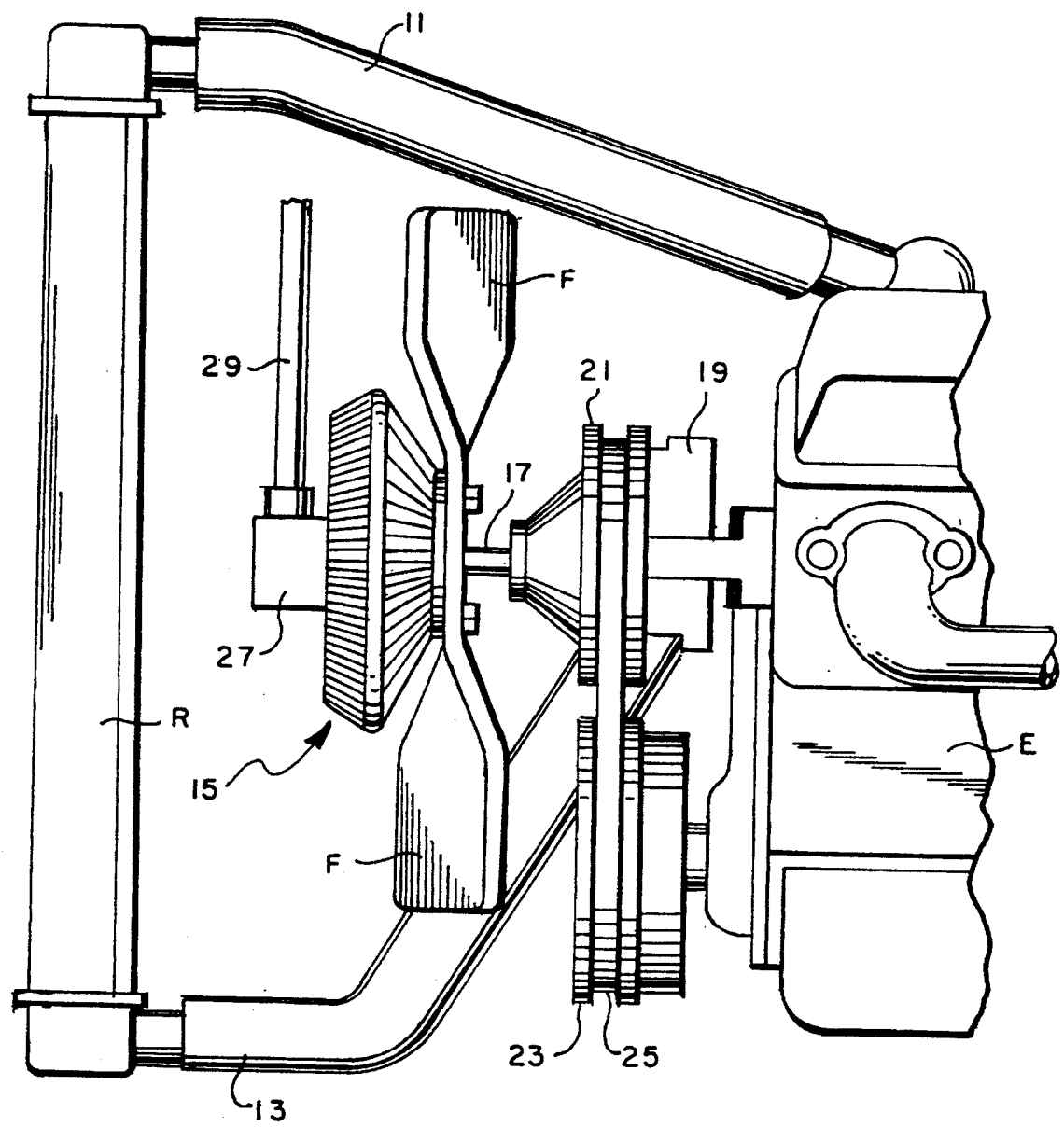
FIG. 1 is a somewhat pictorial side plan view of a vehicle engine cooling system of the type to which the present invention relates.

Referring now to the drawings, which are not intended to limit the invention, FIG. 1 is a somewhat pictorial view of a vehicle engine cooling system of the type which may be used, by way of example only, on a truck or automobile. The system includes an internal combustion engine E and a radiator R, interconnected by hoses 11 and 13 in the usual manner. Thus, fluid coolant can flow from the engine E through the hose 11, then through the radiator R, and return through the hose 13 to the engine E. A viscous fan drive (viscous coupling), generally designated 15, includes an input shaft 17 mounted to an engine coolant pump 19 for rotation therewith. Input shaft 17 and pump 19 are driven, by means of a pair of pulleys 21 and 23, by means of a V-belt 25, as is well known in the art. An actuator assembly 27 is mounted on the front side (left-hand side in FIG. 1) of the viscous coupling 15. An input signal is transmitted to the actuator means 27 by means of a plurality of electrical leads disposed within a conduit 29, the reference numeral "29" also being used hereinafter for the input signal to the actuator means 27. Bolted to the rearward side of the viscous coupling 15 is a radiator cooling fan F, including a plurality of fan blades, also designated "F".

In the subject embodiment, the viscous coupling 15 is made in accordance with the teachings of U.S. Pat. No. 5,152,383, assigned to the assignee of the present invention and incorporated herein by reference. However, it should be understood that the present invention is not limited to any particular configuration of viscous coupling, or any particular type or configuration of actuator means, except as is specifically noted hereinafter.

Figure 2:
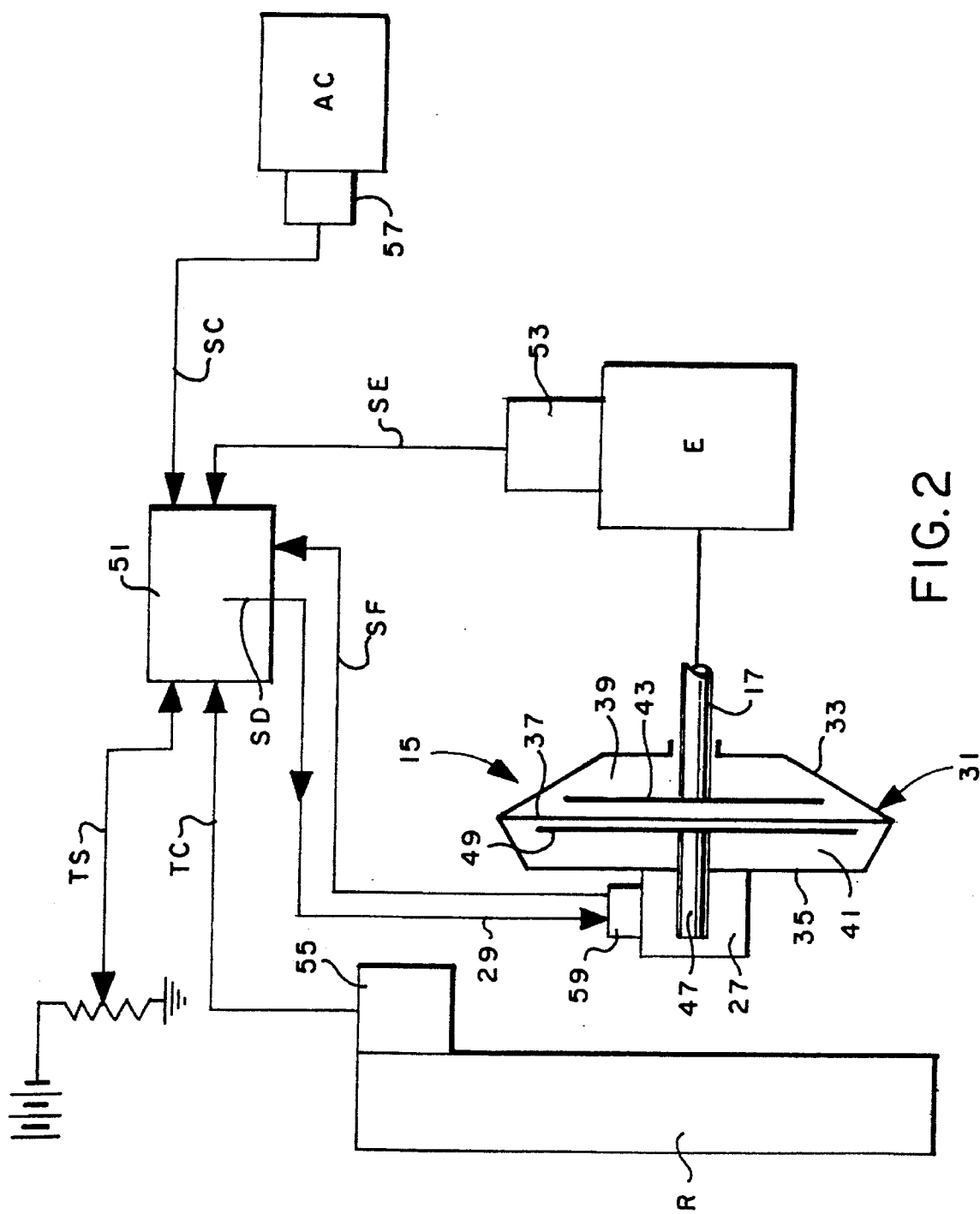
FIG. 2 is a somewhat schematic view of the vehicle engine cooling system, including the control system and logic of the present invention.

Referring now to FIG. 2, there is illustrated a further schematic illustration of the cooling system shown in FIG. 1. As is illustrated in FIG. 2, the viscous coupling 15 includes an output coupling 31, which normally comprises a body member 33 and a cover 35. Together, the body 33 and cover 35 define an enclosed fluid chamber, which is separated by means of a valve plate 37 into a fluid operating chamber 39 and a fluid reservoir chamber 41. Disposed within the operating chamber 39 is an input coupling 43, mounted for rotation with the input shaft 17. Details of the viscous coupling 15 may be better understood by reference to the above incorporated patents.

Figure 3B:
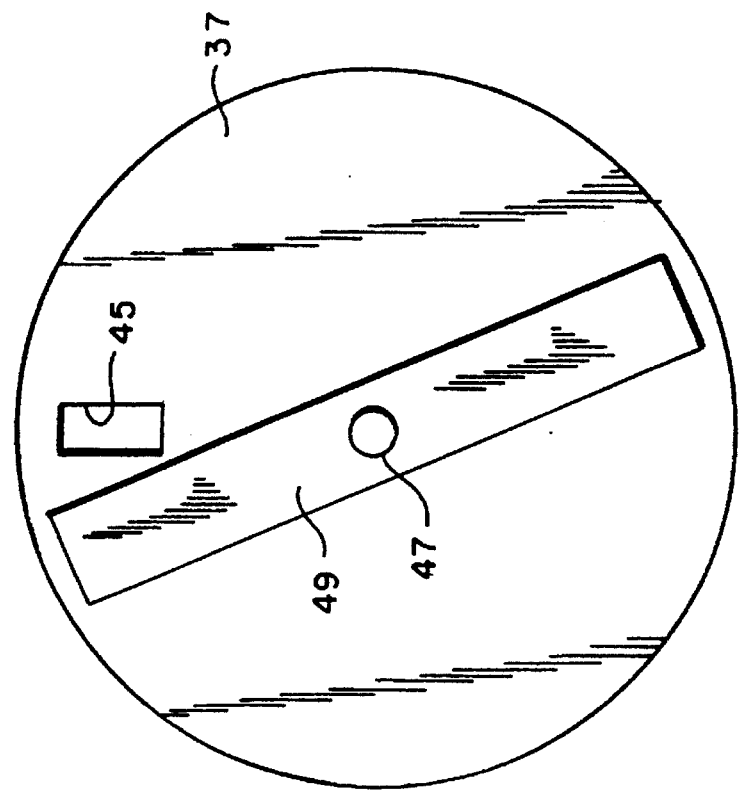
FIGS. 3A and 3B are somewhat schematic plan views of the fan drive valving in the closed and open positions, respectively.
Figure 3A:
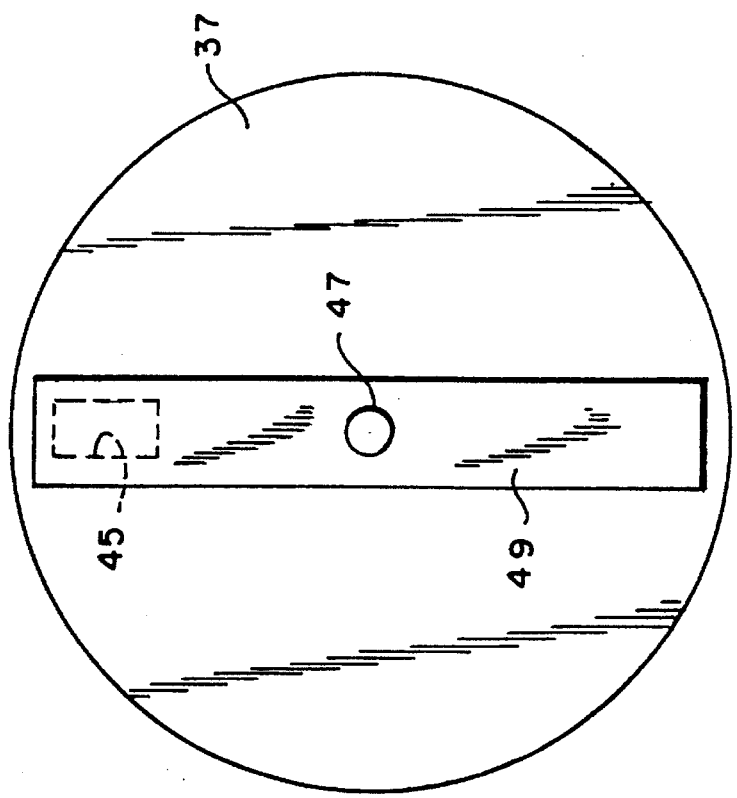

Referring now to FIGS. 3A and 3B, the valve plate 37 defines a fill opening 45, in a manner which is well known to those skilled in the art. The actuator means 27 includes a rotatable armature or shaft 47, to which is mounted a valve arm 49. With the valve arm 49 covering the fill opening 45 ("closed"), as shown in FIG. 3A, the coupling 15 will operate in the disengaged position. With the valve arm 49 uncovering the fill opening 45 ("open"), as shown in FIG. 3B, the coupling 15 will operate in the engaged condition. It should be noted that what is shown in FIGS. 3A and 3B is schematic, and is intended primarily to provide a definition of terms and a basis for understanding certain terms to be used hereinafter. Details of the valving of a preferred embodiment of the invention may be seen in the above incorporated U.S. Pat. No. 5,152,383.

Referring again to FIG. 2, the rotary position of the armature 47 and valve arm 49 are controlled, by the actuator means 27, in response to changes in the input signal 29. The input signal 29 is transmitted to the actuator means 27 from the engine microprocessor 51, which may be of the type in commercial use as of the filing date of the present application. Associated with the vehicle engine E is an engine speed sensor 53 which transmits an engine speed signal SE as one input to the microprocessor 51. Associated with the radiator R is an engine coolant temperature sensor 55 which transmits a coolant temperature signal TC as another input to the microprocessor 51.

Another input to the logic of the microprocessor 51 is a predetermined, nominal engine temperature setting TS, the function of which will be described subsequently. Those skilled in the art will understand that, although the temperature setting TS is illustrated by a potentiometer, the setting TS would typically be built into the software of the microprocessor 51, as a fixed input or setting.

Finally, the vehicle includes an air conditioning system, one component of which is shown schematically in FIG. 2 as an air conditioning compressor AC. Associated with the compressor AC is a sensor 57 which is capable of transmitting a signal SC to the microprocessor 51, the signal SC preferably being capable of indicating either the request for air conditioning (i.e., status of the air conditioning ON or OFF switch), or the pressure of the refrigerant being pumped by the compressor AC. In either case, the signal SC indicates a need for operation of the viscous coupling 15 as a result of the operating state of the air conditioning system.

Preferably, the actuator means 27 is of the type including a fan speed sensor 59 capable of transmitting a fan speed signal SF to the microprocessor 51. The fan speed signal SF measures actual speed of rotation of the fan F, whereas the input signal 29 to the actuator means 27 is generally representative of a demanded fan speed SD, as generated by the microprocessor 51. A fan speed sensor of the type which may be utilized in conjunction with the present invention is illustrated and described in U.S. Pat. No. 4,874,072, assigned to the assignee of the present invention and incorporated herein by reference. Preferably, the microprocessor 51 utilizes the various inputs to generate an appropriate input signal 29 (representative of "demanded" fan speed) in accordance with the teachings of U.S. Pat. No. 4,828,088, assigned to the assignee of the present invention and incorporated herein by reference.

Figure 4:
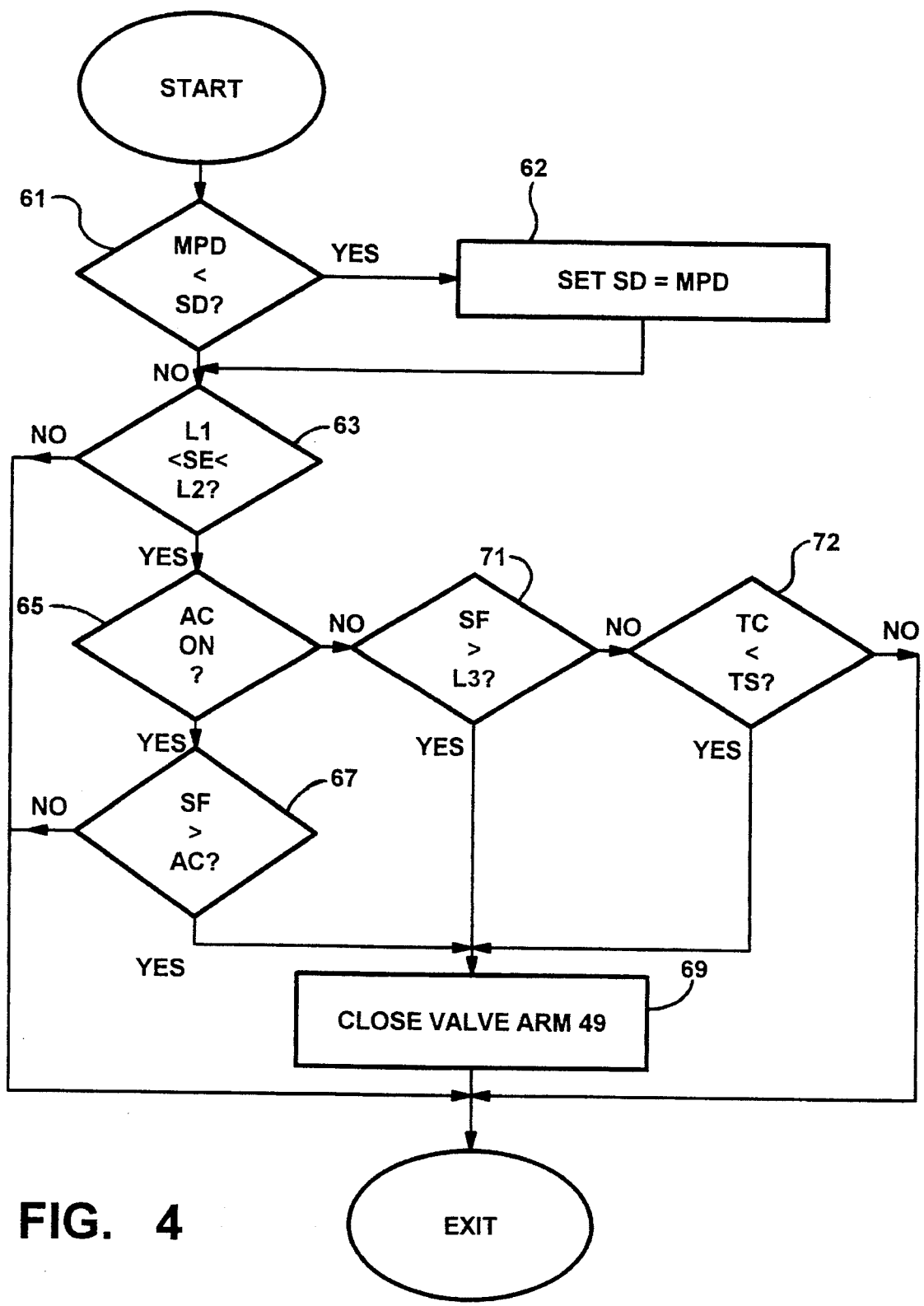
FIG. 4 is a logic diagram for the stoplight idle control logic of the present invention.

Referring now to FIG. 4, the microprocessor 51 receives the various inputs described above, and periodically executes the stop light idle logic. Although the term "idle" is used in reference to this logic, it is not so limited, but really refers to any relatively low engine speed condition. The logic begins with a first decision block 61 in which a "maximum possible demand" MPD is compared to the demanded fan speed signal SD. The maximum possible demand MPD is the highest possible fan speed which the system can demand, and which can be achieved. The determination of MPD must take into account certain factors, such as the pulley ratio between the engine E and the fluid coupling 15, as well as the "slip" speed within the coupling, i.e., the difference between input speed and output speed. If the maximum possible demand MPD is less than SD ("YES"), indicating that the engine speed SE has decreased suddenly, the logic proceeds to an operation block 62 in which the demanded fan speed SD (i.e., input signal 29) is set equal to the then current MPD. For example, if the demanded fan speed SD was 1500 rpm, but the engine speed SE suddenly drops to 1000 rpm, and the pulley ratio is 1.3:1, then the input speed to the fluid coupling 15 will drop to 1300 rpm. If the typical slip within the coupling, under those particular operating conditions, would be 100 rpm, then the maximum possible demand MPD would drop to 1200 rpm, and in the operation block 62, the demanded fan speed SD would be set to be equal to 1200 rpm.

Regardless of the outcome of the decision block 61, the logic eventually proceeds to a decision block 63 in which the engine speed signal SE is compared to a lower limit L1 and to an upper limit L2. By way of example only, limit L1 may be 500 RPM and limit L2 may be 1000 RPM. If the engine speed is greater than L1 but less than L2 ("YES"), in other words, if the engine is stopped at a light and idling, or in some other low speed condition, the logic proceeds to the next decision block. If the engine speed SE is outside the limits ("NO"), the logic is exited, i.e., goes to "EXIT".

If the engine is between L1 and L2, the logic proceeds to a decision block 65 in which the signal SC from the compressor AC is interrogated. If the signal SC indicates that the air conditioning system is operating, or that the compressor pressure is above a predetermined limit ("YES"), the logic proceeds to a decision block 67 in which the fan speed signal SF is compared to a signal which is representative of a demanded fan speed required to meet the cooling needs as a result of the operation of the air conditioning system, and specifically, the compressor AC. If the fan speed signal SF is not greater than the demanded fan speed which relates to the operation of the compressor ("NO"), the logic is exited. If the fan speed signal SF is greater than the demanded fan speed which relates to the operation of the compressor ("YES"), the logic proceeds to an operation block 69 in which the input signal 29 to the actuator means 27 is modified to move the valve arm 49 from the open position shown in FIG. 3B toward the closed position shown in FIG. 3A.

Referring again to the decision block 65, if the air conditioning signal SC indicates that the air conditioning system is not operating, or that the compressor pressure is not above the predetermined limit ("NO"), the logic proceeds to a decision block 71 in which the actual fan speed signal SF is compared to a predetermined speed limit L3. By way of example only, the limit L3 could be about 700 RPM, and would indicate that the fan drive is operating at or near the engaged condition, thus suggesting the need to close the valve arm 49 before input speed to the fan drive increases. If the fan speed signal SF is greater than the limit L3 ("YES"), the logic proceeds to the operation block 69, with the result that the viscous coupling 15 is moved toward the disengaged condition.

If the result of the decision block 71 is negative ("NO"), the logic proceeds to a decision block 72 in which the engine coolant temperature TC is compared to the predetermined temperature setting TS. If the temperature TC is less than the setting TS ("YES"), the logic also proceeds to the operation block 69, with the same result as described previously. If the result of the decision block 73 is negative ("NO"), the logic is exited. This particular logic block provides an "override" type of feature whereby, only if the coolant temperature TC rises above the predetermined temperature setting TS will the logic permit the viscous coupling 15 to continue to operate without moving the valve arm 49 toward the closed position (FIG. 3A). In other words, the fan drive speed may remain the same until the result of either of the decision blocks 65 or 71 is "YES".

Figure 5:
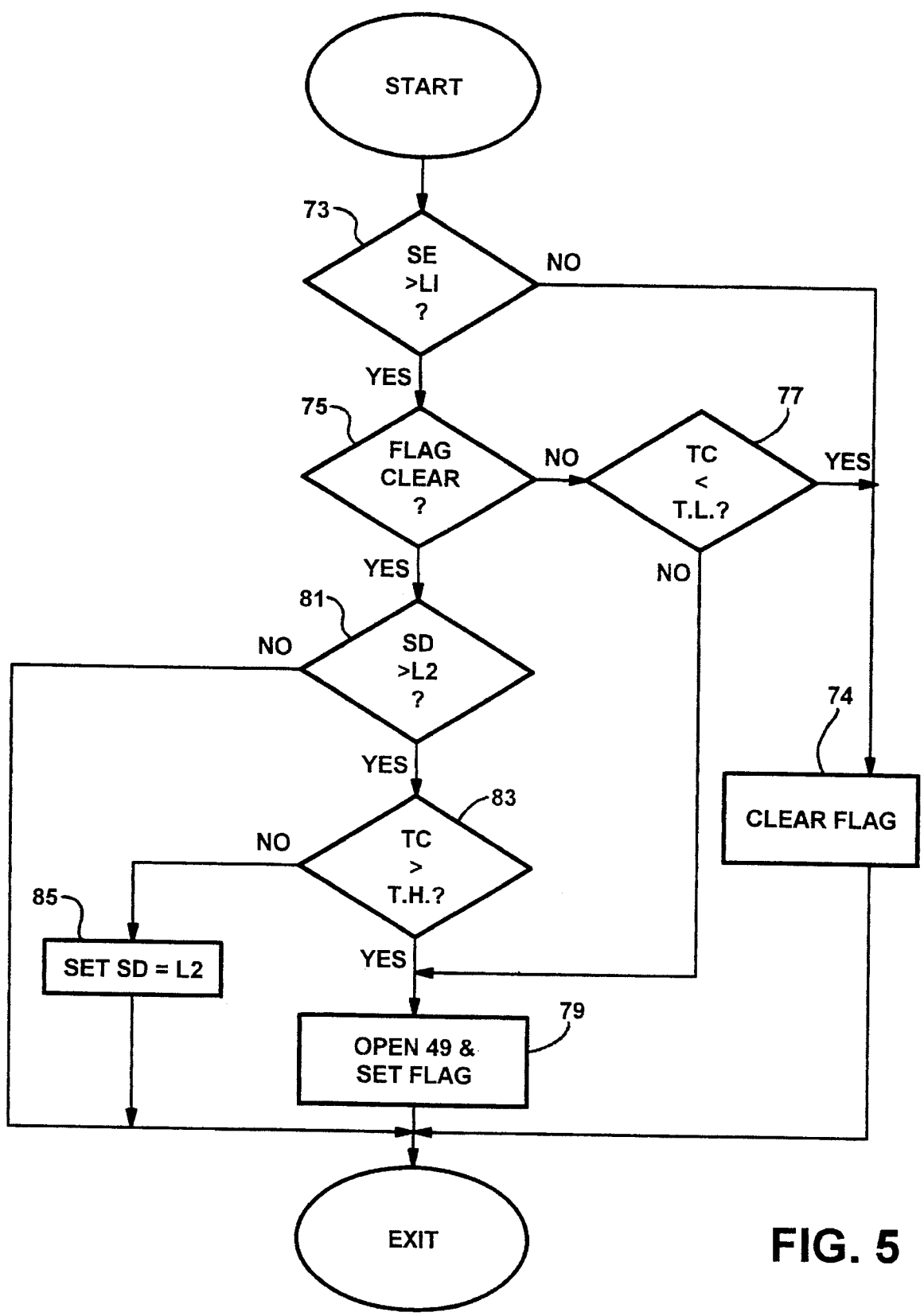
FIG. 5 is a logic diagram for the slip heat protection logic of the present invention.
Figure 6:
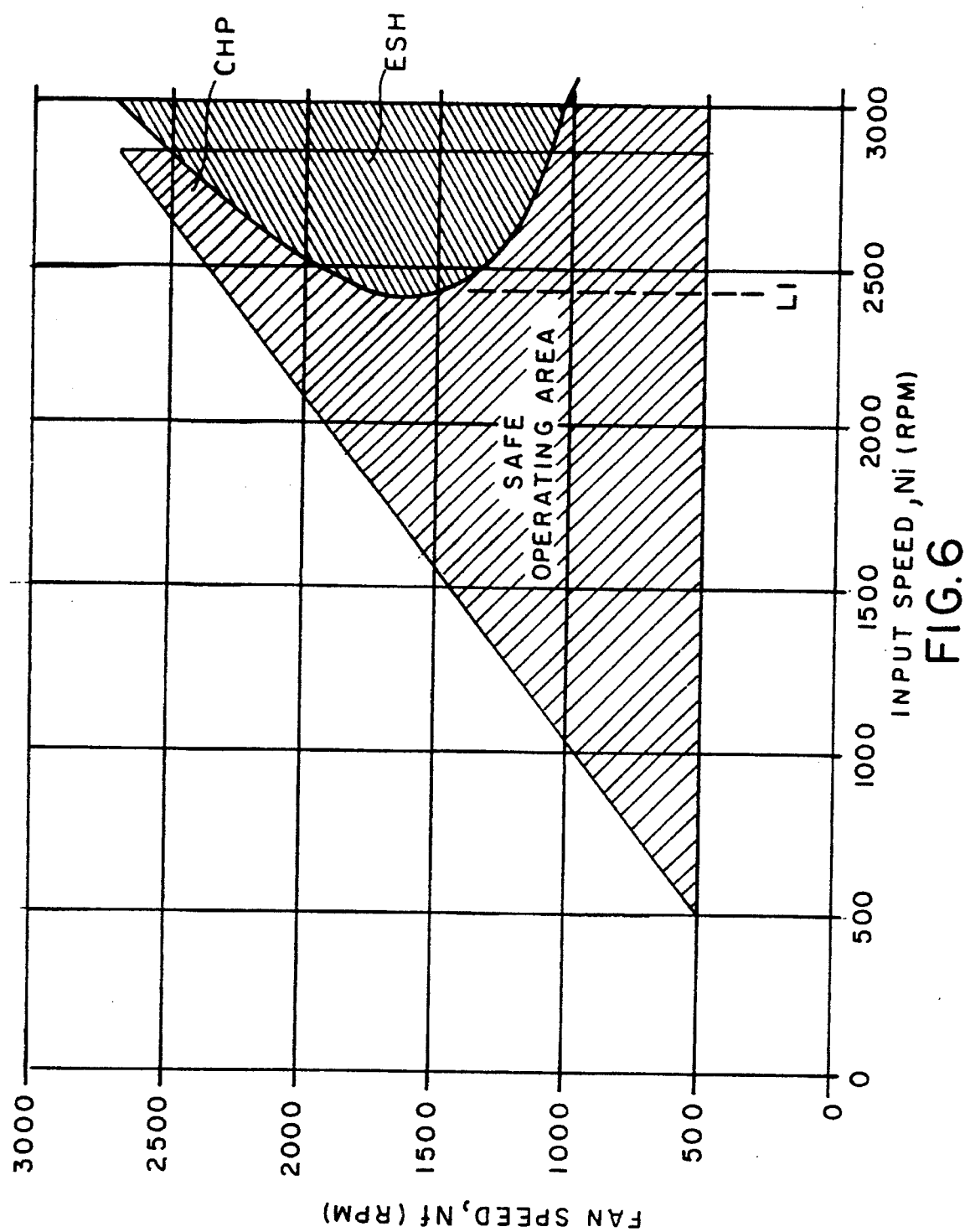
FIG. 6 is a graph of fan speed, in RPM, versus input speed, in RPM, illustrating the slip heat region.

Referring now primarily to FIGS. 5 and 6, the microprocessor 51 periodically executes the slipheat protection logic. The logic begins at a first decision block 73 in which the engine speed signal SE is compared to a lower limit L1. It should be noted that the various limits L1, etc., identified in the logic of FIG. 5 would typically not have the same values as the limits referenced in the logic of FIG. 4, bearing the same references, and should not be confused therewith. Referring now to the graph of FIG. 6, there is illustrated a graph of fan speed (speed of the output coupling 31) versus input speed (speed of the input coupling 43). The purpose of the graph of FIG. 6 is to illustrate that, for any particular fan drive, there is a region of operation in which the particular fan speed and input speed would result in excessive slip horsepower, and therefore, excessive temperature buildup in the fan drive. In FIG. 6, there is a line labeled "CHP" representing the maximum allowable, constant slip horsepower. The coarsely shaded area generally to the left of the CHP line represents "safe" combinations of fan speed and input speed which will not result in excessive slip horsepower. The more finely shaded area, generally to the right of the CHP line and labeled "ESH" represents an area of operation beyond the recommended design limits, i.e., a combination of fan speed and input speed which will result in excess slip horsepower or excess slipheat. As was described in the BACKGROUND OF THE DISCLOSURE, operation in the excess slip heat region ESH means that the fluid coupling 15 will generate more slip heat than it can dissipate normally. Therefore, continued operation in the excess slip heat region can result in degradation of the viscous fluid. The above is all generally well understood by those skilled in the art.

Referring still to FIGS. 5 and 6, the limit L1 to which the engine speed signal SE is compared in the decision block 73 represents the minimum input speed at which slip horsepower becomes a concern (or conversely, the maximum input speed which is certain to be "safe". In the subject embodiment, the lower limit L1 is about 2420 rpm. If the engine speed signal SE is not greater than the lower limit L1 ("NO"), the logic proceeds to an operation block 74 in which the logic is commanded to clear (or reset) a "flag", which serves the purpose of causing the logic to wait before going to "EXIT" and repeating the logic.

If the engine speed signal SE is greater than the lower limit L1 ("ES"), the logic proceeds to a decision block 75 which merely queries the flag to be sure that it is clear. If it is not ("NO"), the logic proceeds to a decision block 77 in which the engine coolant temperature TC is compared to a temperature lower limit. If the temperature TC is less than the lower limit ("YES"), the logic would again proceed to the operation block 73 and clear the flag. By way of example only, the lower limit could be a value 5 degrees F lower than the temperature setting TS. If the temperature TC is not less than the lower limit ("NO"), the logic proceeds to an operation block 79 in which the input signal 29 to the actuator means 27 is modified to move the valve arm 49 from the closed position shown in FIG. 3A toward the open position shown in FIG. 3B, thus increasing the engagement of the fan drive 15.

If the result of the query at the decision block 75 is that the flag is clear ("YES"), the logic proceeds to a decision block 81 in which the demanded fan speed is compared to a second speed limit L2, which is representative of the lower portion of the line CHP on FIG. 6. For example, if the input speed were 2600 rpm, the limit L2 would be about 1230 rpm. Reference is made herein, and in the appended claims, to the limit L2 being "determined", which can mean that the logic actually calculates L2, or can mean that the logic does a "look up" in a table, or consults a "map", or uses any other suitable method. If the demanded fan speed is not greater than the limit L2 ("NO"), the logic is exited, but if the demanded fan speed is greater than the limit L2 ("YES"), the logic proceeds to a decision block 83.

In the decision block 83, the engine coolant temperature TC is compared to a temperature high limit. By way of example only, the high limit could be the temperature setting TS plus 5 degrees F. If the coolant temperature TC is not greater than the high limit ("NO"), the logic proceeds to an operation block 85, the function of which is to re-set the demanded fan speed SD to be equal to the lower part of the line CHP. In other words, the logic was asking for too much fan speed, and that demand is now being reduced, as long as the coolant temperature TC does not exceed the temperature high limit. After the operation block 85, the logic is exited. One function of the decision blocks 77 and 83 is to provide the system with some hysteresis, i.e., to prevent the fan drive from "cycling" between output speeds just below and just above the excess slip heat region ESH, such that, on the average, the fan drive would affectively be operating within the region ESH.

In the decision block 83, if the temperature TC is greater than the temperature high limit ("YES"), the logic again proceeds to the operation block 79, as a result of which the fan drive is moved toward the engaged condition, represented by FIG. 3B. Also, in the operation block 79, the flag is "set", in preparation for the subsequent execution of the logic. After the operation block 79, the logic is exited.

Referring again primarily to FIG. 6, it should be understood that the purpose of the logic is to recognize when the particular combination of input speed (i.e., engine speed signal SE) and fan speed (or demanded fan speed) would result in operation within the excess slipheat region ESH. Once such operation has been recognized, the function of the logic is to cause the fan drive to "jump over" the ESH region, and operate in the "safe" operation region above the ESH region. Preferably, this is accomplished by causing the valve arm 49 to move to the fully open position of FIG. 3B, thus causing the fan drive to operate in a fully engaged condition. For example, with an input speed of 2600 rpm, the logic would cause the fan drive to drive the fan F at a speed of about 2450 rpm, safely above the ESH region.

Theoretically, it would be acceptable for the logic to cause the fan drive to operate on that portion of the line CHP which represents the "upper" limit of the region ESH. Therefore, at an input speed of 2600 rpm, the fan drive would be driven at just under 2200 rpm. However, it is preferable, partly to simplify the logic, and partly as a safety matter, to simply go to a fully engaged condition.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A method of controlling a viscous fluid coupling receiving input drive torque from an engine of a vehicle, and transmitting output drive torque to a radiator cooling fan, the viscous fluid coupling comprising an output coupling defining a fluid chamber, valve means operable to separate said fluid chamber into a reservoir chamber and an operating chamber, an input coupling rotatably disposed in said operating chamber and operable to transmit input drive torque to said output coupling in response to the presence of viscous fluid in said operating chamber, said valve means including a valve member moveable between a closed position (FIG. 3A) blocking fluid flow into said operating chamber, and an open position (FIG. 3B) permitting fluid flow into said operating chamber, and actuator means operable to move said valve member between said closed position and said open position in response to changes in an input signal; said method comprising the steps of:

(a) sensing the speed of the vehicle engine;

(b) comparing said sensed engine speed to a first limit and to a second limit, and when said engine speed is greater than said first limit but less than said second limit; then (c) sensing the speed of rotation of said radiator cooling fan;

(d) comparing said fan speed to a predetermined fan speed limit, and when said fan speed is greater than said predetermined fan speed limit;

(e) modifying said input signal to move said valve member toward said closed position (FIG. 3A).

2. A method of controlling a viscous fluid coupling as claimed in claim 1, characterized by the additional steps of:

(f) sensing the temperature of the coolant of the vehicle engine; and (g) comparing the temperature to a predetermined temperature setting, and, when the temperature is less than said temperature setting, modifying said input signal to move said valve member toward said closed position (FIG. 3A).

3. A method of controlling a viscous fluid coupling as claimed in claim 1, characterized by said vehicle including an air conditioning system comprising a compressor driven by the engine, said method including the additional steps of:

(f) sensing the operating status of the compressor, and if the compressor is operating;

(g) comparing the speed of rotation of said radiator cooling fan to a demanded fan speed representative of the cooling needs resulting from the operation of the compressor; and (h) when the speed of rotation of said fan is greater than said demanded fan speed representative of the compressor, modifying said input signal to move said valve member toward said closed position (FIG. 3A).

4. A method of controlling a viscous fluid coupling as claimed in claim 1, characterized by said vehicle including another control input indicating an additional cooling load on the vehicle, said method including the additional steps of:

(f) sensing the operating status of said another control input;

(g) comparing the speed of rotation of said radiator cooling fan to a demanded fan speed representative of said additional cooling load indicated by said another control input; and (h) when the speed of rotation of said fan is greater than demanded fan speed representative of said additional cooling load, modifying said input signal to move said valve member toward said closed position (FIG. 3A).

5. A system for controlling a viscous fluid coupling receiving input drive torque from an engine of a vehicle, and transmitting output drive torque to a radiator cooling fan, the viscous fluid coupling comprising an output coupling defining a fluid chamber, valve means operable to separate said fluid chamber into a reservoir chamber and an operating chamber, an input coupling rotatably disposed in said operating chamber and operable to transmit input drive torque to said output coupling in response to the presence of viscous fluid in said operating chamber, said valve means including a valve member moveable between a closed position (FIG. 3A) blocking fluid flow into said operating chamber, and an open position (FIG. 3B) permitting fluid flow into said operating chamber, and actuator means operable to move said valve member between said closed position and said open position in response to changes in an input signal; said system comprising:

(a) means for sensing the speed of the vehicle engine;

(b) means for comparing said sensed engine speed to a first limit and to a second limit;

(c) means for sensing the speed of rotation of said radiator cooling fan when said engine speed is greater than said first limit but less than said second limit;

(d) means for comparing said fan speed to a predetermined fan speed limit, and when said fan speed is greater than said predetermined fan speed limit;

(e) means for modifying said input signal to move said valve member toward said closed position (FIG. 3A).

6. A method of controlling a viscous fluid coupling receiving input drive torque form an engine of a vehicle, and transmitting output drive torque to a radiator cooling fan, the viscous fluid coupling comprising an output coupling defining a fluid chamber, valve means operable to separate said fluid chamber into a reservoir chamber and an operating chamber, an input coupling rotatably disposed in said operating chamber and operable to transmit input drive torque to said output coupling in response to the presence of viscous fluid in said operating chamber, said valve means including a valve member moveable between a closed position (FIG. 3A) blocking fluid flow into said operating chamber, and an open position (FIG. 3B) permitting fluid flow into said operating chamber, and actuator means operable to move said valve member between said closed position and said open position in response to changes in an input signal; said method comprising the steps of:

(a) generating a demanded fan speed;

(b) sensing the speed of the vehicle engine;

(c) comparing said sensed engine speed to a first limit, and if the sensed engine speed is greater than said first limit; then (d) determining, for the particular sensed engine speed, a fan speed corresponding to a maximum safe fan speed below a slip heat region;

(e) comparing said demanded fan speed to said maximum safe fan speed, and when said demanded fan speed greater than said maximum safe fan speed;

(f) sensing a temperature representative of the need for cooling and comparing the sensed temperature to a temperature high limit, and when the sensed temperature is less than the temperature high limit, setting demanded fan equal to the maximum safe fan speed; or (g) when the sensed temperature is greater than the temperature high limit, modifying said input signal to move said valve member toward said open position (FIG. 3B).

7. A method of controlling a viscous fluid coupling as claimed in claim 6, characterized by the additional steps of:

(g) calculating, for the particular sensed engine speed, a fan speed corresponding to a minimum safe fan speed above said slip heat region;

(h) comparing said speed of rotation of said cooling fan to said minimum safe fan speed, and when said speed of rotation of said fan is less than said minimum safe fan speed;

(i) modifying said input signal to move said valve member toward a more fully open position (FIG. 3B).

8. A system for controlling a viscous fluid coupling receiving input drive torque form an engine of a vehicle, and transmitting output drive torque to a radiator cooling fan, the viscous fluid coupling comprising an output coupling defining a fluid chamber, valve means operable to separate said fluid chamber into a reservoir chamber and an operating chamber, an input coupling rotatably disposed in said operating chamber and operable to transmit input drive torque to said output coupling in response to the presence of viscous fluid in said operating chamber, said valve means including a valve member moveable between a closed position (FIG. 3A) blocking fluid flow into said operating chamber, and an open position (FIG. 3B) permitting fluid flow into said operating chamber, and actuator means operable to move said valve member between said closed position and said open position in response to changes in an input signal; said system comprising:

(a) means for generating a demanded fan speed;

(b) means for sensing the speed of the vehicle engine;

(c) means for comparing said sensed engine speed to a first limit;

(d) means for determining, for the particular sensed engine speed, a fan speed corresponding to a maximum safe fan speed below a slip heat region, when the sensed engine speed is greater than said first limit;

(e) means for comparing said demanded fan speed to said maximum safe fan speed, and when said demanded fan speed greater than said maximum safe fan speed;

(f) means for sensing a temperature representative of the need for cooling and comparing the sensed temperature to a temperature high limit, and when the sensed temperature is less than the temperature high limit, setting demanded fan equal to the maximum safe fan speed; and (g) means for modifying said input signal to move said valve member toward said open position (FIG. 3B) when the sensed temperature is greater than the temperature high limit.

* * * * *